United States Patent [19]

Olsen et al.

[11] 4,267,301

[45] May 12, 1981

[54] LINEAR HYDROQUINONE PHENOXY POLYMERS AND PROCESS

[75] Inventors: Eric G. Olsen; Winston J. Jackson, Jr., both of Kingsport, Tenn.

[73] Assignee: Eastman Kodak Company, Rochester, N.Y.

[21] Appl. No.: 108,722

[22] Filed: Dec. 31, 1979

[51] Int. Cl.$^3$ .............................................. G08G 59/06
[52] U.S. Cl. ....................................... 528/93; 528/87; 528/104; 428/413
[58] Field of Search ...................... 528/87, 93, 95, 104

[56] References Cited

U.S. PATENT DOCUMENTS

| | | | |
|---|---|---|---|
| 2,602,075 | 7/1952 | Carpenter et al. | 260/47 |
| 3,238,087 | 3/1966 | Norwalk et al. | 161/185 |
| 3,395,118 | 7/1968 | Reinking et al. | 260/47 |
| 3,701,680 | 10/1972 | Lee et al. | 117/138.8 F |
| 3,767,618 | 10/1973 | Hairston et al. | 528/95 |

*Primary Examiner*—Earl A. Nielsen
*Attorney, Agent, or Firm*—William P. Heath, Jr.; Daniel B. Reece, III

[57] ABSTRACT

This invention relates to a process for the preparation of thermoplastic polymers. Specifically it relates to a process for the preparation of a substantially linear, high molecular weight phenoxy resin from hydroquinone, optionally up to about 20 mole percent of a second aromatic diol, epichlorohydrin (or another epihalohydrin) and a base, such as sodium hydroxide.

Hydroquinone phenoxy resin is characterized by low permeability to oxygen and carbon dioxide and is, therefore, useful as a gas-barrier layer in multilayer plastic film constructions used in food-packaging and beverage bottle applications, for example. For use in such applications, the resin is generally in the form of a thin, uniform film prepared by extrusion, casting, or other such method. It is highly desirable that polymers used in this manner be as free as possible from chain branches or crosslinks, as these lead to the formation of gel particles which cause imperfections in the polymer film. These imperfections, in turn, detract from the appearance of the film. Moreover, as is well known, increasing the amount of chain branching in a polymer results in a undesirable reduction of flexibility and toughness.

27 Claims, No Drawings

LINEAR HYDROQUINONE PHENOXY POLYMERS AND PROCESS

DESCRIPTION

1. Technical Field

This invention relates to new high molecular weight, essentially linear hydroquinone phenoxy polymers. It is particularly concerned with polymers made from hydroquinone, which may be replaced with up to about 50 mole percent resorcinol, and an epiholohydrin. The polymers are characterized by low permeability to oxygen and carbon dioxide and are particularly useful as a gas-barrier layer in multilayer plastic film and in beverage bottles.

This invention also relates to a new process for producing the novel hydroquinone polymers, the process involving reacting hydroquinone, which may be replaced with up to about 50 mole percent resorcinol, with about 0.95 to 1.05 equivalents of an epihalohydrin in the presence of about 1.0 to 1.1 equivalents of a base and about one to seven parts by weight of a solvent for the polymer per part polymer. It is preferred that water be present in the amount of from 0.8 to 10 parts by weight polymer and that a phase transfer catalyst be used.

The new process results in polymer that is essentially free from chain branches or cross-links which lead to gel particles in the polymer. The polymer produced by our process is particularly useful for forming films which exhibit unusual gas barrier properties and thus are particularly suitable in food-package and beverage bottle applications.

2. Background Art

Two processes for the preparation of hydroquinone phenoxy resin have been disclosed by A. S. Carpenter, E. R. Wallsgrove and F. Reeder (British Pat. No. 652,024). In the first process, hydroquinone bis(glycidyl ether) is allowed to react with hydroquinone under the influence of a suitable catalyst. We have found that this process gives material which is highly branched, and in some cases a crosslinked, infusible resin is obtained.

According to the second procedure of Carpenter et al, hydroquinone phenoxy resin is formed directly from hydroquinone, epichlorohydrin, and base (e.g., sodium hydroxide) in an ethanol-water reaction medium. Low molecular weight polymer precipitates early in the reaction, and its molecular weight increases slowly thereafter in a heterogeneous reaction. We have found that this reaction gives erratic results because of solvent-induced crystallization of the polymer phase. In some cases, gelled material is produced, while in other cases only low molecular weight polymer is obtained.

On the other hand, an analogous phenoxy resin, prepared from bisphenol A (4,4'-isopropylidenediphenol), may be prepared by several methods similar to the above, but which fail when applied to hydroquinone phenoxy resin.

These methods fail with hydroquinone phenoxy resin because, being heterogeneous reactions, they depend upon facile transfer of monomer molecules from the solution phase to the semi-solid polymer phase. Hydroquinone phenoxy resin, however, becomes crystalline under the influence of the water or water-alcohol reaction medium and is no longer penetrable by monomer molecules. This results in low average molecular weight, broad molecular weight distribution, and in irreproducible results. The reaction conditions are suitable for bisphenol A phenoxy resin, on the other hand, because this latter resin is not crystallizable under the reaction conditions and remains permeable to monomer molecules.

Bisphenol A phenoxy resin may be prepared directly from bisphenol A, base, and epichlorohydrin in an alcohol/water reaction mixture (U.S. Pat. No. 3,305,528) in a process very similar to the hydroquinone phenoxy resin process disclosed in British Pat. No. 652,024 above. It may also be prepared in an "interfacial" process in which one phase of the reaction medium is aqueus base (e.g., NaOH) and the other phase is the polymer itself (U.S. Pat. No. 3,767,618). These methods work for bisphenol A phenoxy resin because it does not crystallize under the reaction conditions. Because hydroquinone phenoxy resin does crystallize, it cannot be prepared by these methods.

U.S. Pat. No. 3,238,087 discloses laminated structures in which one component is a hydroquinone phenoxy resin. However, no process is given or suggested which will produce the particular hydroquinone phenoxy polymer disclosed in this specification.

We are not aware of a patent covering the use of a two-phase solvent system in which the polymer is soluble in one component. Indeed, U.S. Pat. No. 3,767,618 teaches that such a system leads to inferior results with the bisphenol A resin (cf. their example 4).

DISCLOSURE OF THE INVENTION

This invention relates to a process for the preparation of thermoplastic polymers. Specifically, it relates to a process for the preparation of a substantially linear, high molecular weight phenoxy resin from hydroquinone, optionally up to 20 mole percent of a second aromatic diol, epichlorohydrin (or another epihalohydrin) and a base, such as sodium hydroxide, and the polymer produced thereby.

The hydroquinone phenoxy resins or polymers of this invention are characterized by low permeability to oxygen and carbon dioxide and are, therefore, useful as a gas-barrier layer in multilayer plastic film constructions used in food-packaging applications and beverage bottle applications, for example. For use in such applications, the resin is generally in the form of a thin, uniform film prepared by extrusion, casting, or other such method. It is highly desirable that polymers used in this manner be as free as possible from chain branches or crosslinks, as these lead to the formation of gel particles which cause imperfections in the polymer film. These imperfections, in turn, detract from the appearance of the film. Moreover, as is well known, increasing the amount of chain branching in a polymer results in an undesirable reduction of flexibility and toughness.

In the food packaging and beverage bottling industries, plastic film which can be shaped into containers by extrusion blow molding, forging, stretch-blow molding or other processes is highly desirable. These plastic containers must not only be strong but must also have low permeability to gases, especially oxygen and/or carbon dioxide, in order to prevent spoilage of the contents of the package. In order to provide the optimum combination of properties in the most economical way, multiple-layer film structures may be produced by lamination, coextrusion, solution casting or other such methods in which the layers may consist of different polymers or polymer blends chosen to impart specific desirable properties to the overall layered film.

It is necessary that such a film have a low permeability to oxygen and/or carbon dioxide. It is also necessary that the layers of the film adhere to one another well, preferably when coextruded. The multilayer film and its individual components should also possess good thermal stability for ease of melt processing. And to enable the reuse of scrap laminated film by regrinding and blending of scrap with virgin material, it is desirable that all of the components of the multilayer film be compatible when reextruded. Finally the multilayer film must be capable of being formed into suitable containers by processes such as stretch-blow molding, forging and so on, without loss of its desirable properties.

It is known that poly(ethylene terephthalate) modified with up to about 35 mole percent of other diacids or glycols is particularly well suited to film extrusion and subsequent theremoforming processes, although its permeability to oxygen and carbon dioxide is high. We have found that hydroquinone phenoxy resin may be combined with these polyesters in a mutlilayer film structure which, surprisingly, has excellent adhesion between layers when coextruded, has good compatibility when scrap is reextruded, has low gas permeability and which may be thermoformed without loss of these desirable properties.

Multilayer constructions may be prepared by various techniques such as lamination, solvent casting or coextrusion, the latter being the preferred process from an economic and practical standpoint. In addition to flat sheet, the multilayer structure may be in the form of a tube or may be formed as part of an extrusion-blow molding process.

The individual layers of the structure may be composed of pure components, e.g., polyester or hydroquinone phenoxy resin, or of a blend of one or more polyesters and hydroquinone phenoxy resin, such as may be produced by the blending of virgin polymer with reground scrap multilayer film prior to extrusion. In general it is preferred that the multilayer structure contain at least one layer of pure hydroquinone phenoxy resin to obtain the optimum gas barrier property for the film structure; however, the desirable mechanical properties of the polyester are essentially unaffected by blending with hydroquinone phenoxy resin.

We have found that high molecular weight, essentially linear hydroquinone phenoxy resin may be prepared by the reaction of hydroquinone, an epihalohydrin such as epichlorohydrin, and a base such as sodium hydroxide, in a reaction medium consisting of water and a polymer solvent, such as cyclohexanone. A phase-transfer catalyst such as benzyltriethylammonium chloride is used to enhance the transport of reagents across the aqueous/organic phase boundary and thereby accelerate the reaction rate.

In contrast to the previously-described methods, this phase-transfer solution polymerization is reproducible, suitable for scale-up, and gives a product whose ratio of weight-average molecular weight ($\overline{M}w$) to number-average molecular weight ($\overline{M}n$) is lower (for a given polymer inherent viscosity) than that obtained with other known methods, indicating a lower degree of chain branching.

It is surprising that high molecular weight hydroquinone phenoxy resin can be made in the presence of an organic polymer solvent in view of the results obtained by T. J. Hairston and W. L. Bressler (U.S. Pat. No. 3,767,618) who demonstrated that for bisphenol A phenoxy resin, lower molecular weights are obtained when an organic solvent is added to the aqueous reaction mixture. Thus, hydroquinone phenoxy resin behaves in a manner opposite to that of the closely analogous bisphenol A phenoxy resin.

Broadly the process of our invention for making our novel polymers comprises a process for the preparation of high molecular weight linear hydroquinone phenoxy polymer from hydroquinone and an epihalohydrin, said process comprising reacting hydroquinone with about 0.95 to about 1.05 equivalents of an epihalohydrin in the presence of about 1.0 to 1.1 equivalents of a base and about one to seven parts by weight solvent for said polymer per part polymer.

A preferred process of this invention involes reacting hydroquinone with epichlorohydrin in the presence of sodium hydroxide, in a reaction medium consisting of water, cyclohexanone and benzyltriethylammonium chloride as the phase-transfer catalyst at a temperature of about 50° C. to about 100° C. for a time of about two to about six hours. At the end of this time, the polymer may be isolated by any one of several procedures well known to the art.

The novel linear hydroquinone phenoxy polymer of this invention which may be prepared from hydroquinone and an epihalohydrin is characterized by an inherent viscosity of about 0.45 to 0.9 as determined at 25° C. in a 60/40 by volume mixture of phenol/tetrachloroethane at a concentration of 0.5 gram/deciliter, a molecular weight distribution, as determined by gel permeation chromatography, of $\overline{M}w/\overline{M}n \leq$ about 4 and $\overline{M}z/\overline{M}n \leq 10$. The preferred inherent viscosity is about 0.5 to 0.7 and the preferred $\overline{M}w/\overline{M}n$ is $\leq 3$. The polymer may be modified by up to about 50 mole percent resorcinol with up to about 10 mole percent being preferred. Shaped objects such as films made from the polymer of our invention are particularly useful in a barrier layer in films and containers for food packaging applications.

The reactants include hydroquinone, an epihalohydrin, and a base which is capable of effecting deprotonation of the aromatic diol and of catalyzing the polymerization. The hydroquinone may be replaced with up to about 20 mole percent of a diol selected from methylhydroquinone, chlorohydroquinone, resorcinol, bisphenol A, tetrachlorobisphenol A, phenolphthalein. Compounds in which the hydroxyl groups are located on adjacent carbon atoms of the same aromatic ring such as catechol, however, are not preferred because of the possibility of forming a closed-ring structure with one molecule of the epihalohydrin component.

Epihalohydrins which may be used include epichlorohydrin, epibromohydrin and epiiodohydrin, the preferred component being epichlorohydrin for economic reasons. In addition, 1,3-dihalohydrins, e.g., glycerol α, γ-dichlorohydrin, may be used if an additional equivalent of base is used, per equivalent of dihalohydrin, in order to generate the epihalohydrin in situ.

The base used may be any base strong enough to deprotonate the aromatic diol to form its mono-anion. Examples of such bases are sodium hydroxide, potassium hydroxide, lithium hydroxide, tetraalkylammonium hydroxides, or the alkali metal salts of alcohols such as methanol, ethanol, or tert-butanol. Sodium hydroxide is generally the preferred reagent, because of its low cost.

The proportions of reactants used are about 0.95 mole to about 1.05 mole of epihalohydrin per equivalent of diol (or diol mixture) and about 1.0 to about 1.1 mole of base per mole of diol (or diol mixture). It is preferred to use about 0.98 mole of epihalohydrin per mole of diol in order to minimize chain branching; it is also preferred to use about 1.1 mole of base per mole of diol to provide a convenient reaction rate while limiting the extent of side reactions.

The solvent system consists of water and an organic solvent which is capable of dissolving the polymer and may or may not be immiscible with water. Such solvents include, but are not limited to cyclohexanone, 2-butanone, acetophenone, dichloromethane, γ-butyrolactone, sulfolane, dimethyl sulfoxide, N-methyl-2-pyrrolidone, N,N-dimethyl formamide and triethyl phosphate. The choice of a solvent depends to some extent on the solubility characteristics of the polymer being prepared; for hydroquinone phenoxy resin, the preferred solvent is cyclohexanone.

The proportion of water may range from about 0.8 part by weight water per part polymer to about 10 parts water per part polymer. The amount of organic solvent may vary from about 1 part to about 7 parts by weight solvent per part polymer. It is preferred to use the minimum amounts of water and organic solvents consistent with convenient handling in order to enhance the reaction rate. Moreover, it may be desirable to dilute the organic phase with additional organic solvent at the end of the reaction in order to facilitate the subsequent handling of the polymer solution.

The phase-transfer catalyst may be any one of several known to the art, including quaternary ammonium halides such as methyl tricaprylylammonium chloride, benzyltriethylammonium chloride, tetrabutylammonium bromide, etc., cyclic polyethers such as cyclic hexamer of ethylene glycol; or acyclic polyethers, such as poly(ethylene glycol). The amount of the catalyst may vary from about 0.01 to 1.10 mole catalyst per mole of diol. Higher amounts may be used, but are uneconomical. The preferred range is 0.02 to 0.05 mole catalyst per mole of diol; the preferred catalyst is benzyltrimethylammonium chloride or benzyltriethylammonium chloride.

The temperature of the reaction may be from about 50° C. to about 100° C., the preferred range being from about 80° C. to 90° C. Time of reaction may be from about two to about six hours depending on the temperature and degree of conversion required. A typical reaction time is four hours at 90° C.

At the end of the reaction, the reaction mixture is acidified by the addition of acetic acid, phosphoric acid, hydrochloric acid, etc., and the aqueous phase is drawn off. If desired, the polymer solution may be diluted, washed with water to remove residual sodium chloride, and the polymer may be recovered by removal of solvent by means of heat and/or vacuum. Alternatively, the polymer may be recovered by coagulation of the polymer solution with a polymer nonsolvent, a procedure which is well known.

This invention will be further illustrated by the following examples although it will be understood that these examples are included merely for purposes of illustration and are not intended to limit the scope of the invention.

Inherent viscosities (I.V.) were determined in a 60/40 (v./v.) mixture of phenol and tetrachloroethane at a concentration of 0.5 g./dl., at 25° C.

Determination of molecular weight distribution was performed by gel permeation chromatography (GPC) on a Waters Associates Model 200 GPC unit equipped with Styragel columns (Waters Associates), in m-cresol solvent, at a column temperature of 100° C. The columns were calibrated with polyethylene terephthalate (PET) standards, and the values of number-average, weight-average, and z-average molecular weights ($\overline{M}n$, $\overline{M}w$, and $\overline{M}z$) were calculated as PET-equivalent weights. An example of the calculation is given by N. C. Billingham in "Practical High Performance Liquid Chromatography", C. F. Simpson, ed., Heyden and Son Ltd., 1978, page 104, incorporated herein by reference.

EXAMPLE 1

To a 500 ml. Morton-type flask equipped with a propeller-shaped stirrer, thermocouple, reflux condenser, nitrogen inlet, and serum cap was added 27.53 g. of hydroquinone, 64 ml. water, 6.00 g. of phase-transfer catalyst methyl tricaprylylammonium chloride (Aliquat 336), and 80 ml. of cyclohexanone. The system was thoroughly purged with nitrogen, and 23.13 g. epichlorohydrin was introduced through the serum cap. To the stirred reaction mixture was added 23.00 g. of 50% aqueous NaOH, and the reaction was heated with stirring at 80° C. for 3.5 hours. The reaction was quenched with 15 ml. acetic acid, the aqueous layer was drawn off, the polymer solution was diluted with an equal volume of acetic acid, and the polymer was precipitated by the addition of methanol (250 ml.) with stirring. The polymer was collected by filtration, washed with water and methanol, and dried under vacuum at 95° C. The polymer was obtained as a white powder, I.V.=0.45, $\overline{M}w/\overline{M}n=2.20$, $\overline{M}z/\overline{M}n=4.60$.

EXAMPLE 2

The apparatus of Example 1 was charged with:
55.06 g. (0.50 mole) hydroquinone
6.04 g. (0.026 mole) benzyltriethylammonium chloride
50 ml. water
80 ml. cyclohexanone
46.26 g. (0.50 mole) epichlorohydrin.

After thorough purging with nitrogen, 44.0 g. (0.55 mole) of a 50% aqueous NaOH solution was added, and the reaction mixture was heated to 80° C. for 2.7 hours. The mixture was acidified with 30 ml. acetic acid, diluted with 40 ml. cyclohexanone and 50 ml. water, and the aqueous layer was drawn off. The polymer solution was washed with 50 ml. water, and solvent was removed under vacuum at 110° C. to 200° C. to yield an amorphous polymer, inherent viscosity (PTCE) 0.75.

EXAMPLE 3

The apparatus of Example 1 was charged with:
28.08 g. (0.255 mole) hydroquinone
3.02 g. (0.013 mole) benzyltriethylammonium chloride
65 ml. water
40 ml. cyclohexanone
23.13 g. (0.250 mole) epichlorohydrin (98% of theory).

The reaction was thoroughly purged with nitrogen, and 22.0 g. (0.275 mole, 1.1 equivalent) of 50% aqueous sodium hydroxide solution was added. The reaction mixture was heated to 90° C. with stirring for six hours and 15 ml. acetic acid was added. During the reaction, 20 ml. cyclohexanone was added to facilitate stirring. The aqueous layer was drawn off, and the polymer solution was diluted with 10 ml. cyclohexanone and washed with 75 ml. water. The polymer was stripped of solvent under vacuum at 200° C. to yield amorphous, clear amber polymer, I.V.=0.58, ($\overline{M}w/\overline{M}n$)=2.5, ($\overline{M}z/\overline{M}n$)=5.2, residual Cl 0.8%.

EXAMPLE 4

Using polymer prepared following the same procedure as in Example 3, blends were prepared wih hydroquinone phenoxy resin (10 percent by weight) and a copolyester of terephthalic acid and an 87/13 mole ratio of ethylene glycol and 2,2-dimethyl-1,3-propanediol; and with a copolyester of an 87/13 mole ratio of terephthalic and isophthalic acids and ethylene glycol. Films prepared from the blends contained little or no haze.

EXAMPLE 5

A 15 mil thick film of poly(ethylene terephthalate) modified with 13 mole percent of 1,4-cyclohexanedimethanol was placed on a 15 mil film of hydroquinone phenoxy resin prepared from the polymer of Example 3 and the two were pressed together at 150° C. (1000 psi., 15 seconds). The resulting laminated film could be bent, flexed and torn without delamination.

EXAMPLE 6

Mechanical blends of hydroquinone phenoxy resin (10 percent by weight) (prepared from the polymer of Example 3) were prepared with each of the following polyesters: polyester A, poly(ethylene terephthalate); polyester B, a copolyester of terephthalic acid and an 87/13 mole ratio of ethylene glycol and 1,4-cyclohexanedimethanol (CHDM); polyester C, a copolyester of terephthalic acid and a 70/30 mole ratio of ethylene glycol and CHDM; polyester D, a copolyester of terephthalic acid and a 35/65 mole ratio of ethylene glycol and CHDM. These blends were compounded by extrusion and 10 mil films were pressed from the blend. Films prepared from blends with polyesters A, B and C showed little or no haze while the blend with polyester D was very hazy, indicating polymer incompatibility.

EXAMPLE 7

To simulate the use of reground, reprocessed multilayer film scrap, a blend of hydroquinone phenoxy resin (HQPR) and polyester B of Example 6 was prepared by extrusion compounding. This simulated regrind was blended with virgin polyester B at levels of 10 percent, 20 percent, 30 percent, etc. up to 70 percent by weight of simulated regrind, and the blends were reextruded. Films pressed from each of the blends showed excellent clarity. The mechanical properties of the polyester B+HQPR blends were unchanged from those of virgin polyester B. In a control experiment a simulated regrind prepared as above but containing 10 percent by weight of ethylene-vinyl alcohol copolymer (EVAL) produced a hazy blend with polyester B at even the 10 percent regrind level.

EXAMPLE 8—Comparative

Following the procedure of U.S. Pat. No. 3,238,087, Example 1, a 500 ml., three-neck flask equipped with a thermocouple, stainless steel stirrer, reflux condenser and nitrogen atmosphere was charged with:

55.06 g. (0.500 mole) hydroquinone
10.00 g. tert-butanol
96 g. ethanol
48 ml. water
46.26 g. (0.500 mole) epichlorohydrin
44.07 g. (0.55 mole) 50% aqueous NaOH solution.

The contents of the flask were stirred at room temperature for 22 hours, heated to 80° C., and stirred for one hour. Cyclohexanone (35 ml.) was added and the mixture was stirred for two hours. Phenol (4.5 g., 0.048 mole) and cyclohexanone (30 ml.) were added and heating was continued an additional 2.5 hours. The reaction mixture was cooled and the mixture was washed with 200 ml. water to yield a cheesy, semi-solid polymer mass. This was precipitated in methanol (one liter) to yield a fine white powder softening at 155° C. to 160° C. which flowed with great reluctance at 225° C. A solution of the polymer in dimethyl formamide (5 percent solids) contained small gel particles.

EXAMPLE 9—Comparative

This procedure is based on the teaching of A. S. Carpenter et al, British Pat. No. 652,024. A one-liter, three-neck flask was charged with 110 g. (1.0 mole) hydroquinone, and 263 ml. absolute ethanol, and degassed. To the solution was added a solution of 44.90 g. (1.10 mole) sodium hydroxide pellets (98%) in 162.5 ml. water. The mixture was heated to reflux, and 92.53 g. (1.00 mole) epichlorohydrin was added slowly, followed by 63 ml. ethanol. The reaction mixture was stirred under reflux for six hours and 35 ml. glacial acetic acid was added. The precipitate was collected on a Buchner funnel, rinsed and dried to yield off-white powder. A solution of the polymer in phenol/tetrachloroethylene solvent contained gel particles. Molecular weight distribution Mw/Mn (by GPC)=15.3, Mz/Mn=148.2, indicating considerable chain branching.

EXAMPLE 10—Comparative

This example follows the interfacial polymerization procedure taught by T. J. Hairston, et al. [U.S. Pat. No. 3,767,618]. The apparatus of Example 1 was charged with 27.53 g. (0.250 mole) hydroquinone and 180 ml. water and degassed. To the solution was added 40 g. (0.50 mole) of a 50% aqueous solution of sodium hydroxide. The solution was heated to 80° C. and stirred rapidly as 23.13 g. (0.250 mole) epichlorohydrin was added rapidly. The reaction mixture was stirred rapidly for 20 minutes, cooled, and acidified with 20 ml. glacial acetic acid. Filtration yielded a tacky brownish solid, partially soluble in methanol. The polymer could not be formed into a tough film, indicating that insufficient molecular weight was achieved.

EXAMPLE 11—Comparative

Example 10 was repeated, extending the reaction time to 3.2 hours. The product was an insoluble gel.

The invention has been described in detail with particular reference to preferred embodiments thereof, but it will be understood that variations and modifications can be effected within the spirit and scope of the invention.

We claim:
1. Process for the preparation of high molecular weight linear hydroquinone phenoxy polymer from hydroquinone and an epihalohydrin, said process comprising reacting hydroquinone with about 0.95 to about 1.05 equivalents of an epihalohydrin in the presence of about 1.0 to 1.1 equivalents of a base and of about one to seven parts by weight solvent for said polymer per part polymer.

2. Process of claim 1 wherein water is present in the amount of about 0.8 to 10 parts by weight water per part polymer.

3. Process of claim 2 wherein said solvent is immiscible with water.

4. Process of claim 1 wherein said solvent is selected from cyclohexanone, 2-butanone, acetophenone, dichloromethane, γ-butyrolactone, sulfolane, dimethyl sulfoxide, N-methyl-2-pyrrolidone, N,N-dimethyl formamide and triethyl phosphate.

5. Process of claim 1 wherein said base is selected from sodium hydroxide, potassium hydroxide, lithium hydroxide, tetraalkylammonium hydroxides and alkali metal salts of alcohols.

6. Process of claim 1 wherein a phase transfer catalyst is present in the amount of up to about 10 mole percent of the hydroquinone.

7. Process of claim 6 wherein said catalyst is selected from quaternary ammonium halides, sulfates, acetates, cyclic polyethers and acyclic polyethers.

8. Process of claim 7 wherein said catalyst is present in the amount of 1 to 5 mole percent of the hydroquinone.

9. Process of claim 8 wherein said catalyst is selected from benzyltrimethylammonium chloride and benzyltriethylammonium chloride.

10. Process of claim 1 wherein the reaction temperature is from about 50° C. to 100° C.

11. Process of claim 1 wherein the reaction temperature is from about 80° C. to 90° C.

12. Process of claim 1 wherein up to about 20 mole percent of the hydroquinone is replaced with an aromatic diol.

13. Process of claim 12 wherein said aromatic diol is resorcinol.

14. Process of claim 1 wherein up to about 10 mole percent of the hydroquinone is replaced with an aromatic diol.

15. Process of claim 14 wherein said aromatic diol is resorcinol.

16. Linear hydroquinone phenoxy polymer prepared from hydroquinone and an epihalohydrin, said polymer being characterized by an inherent viscosity of about 0.45 to 0.9 as determined at 25° C. in a 60/40 by volume mixture of phenol/tetrachloroethane solvent at a concentration of 0.5 gram/deciliter, a molecular weight distribution, as determined by gel permeation chromatography, of $\overline{M}w/\overline{M}n \leq$ about 4 and $\overline{M}z/\overline{M}n \leq$ about 10.

17. Linear hydroquinone phenoxy polymer of claim 16, wherein the inherent viscosity is about 0.5 to 0.7.

18. Linear hydroquinone phenoxy polymer of claim 16 wherein $\overline{M}w/\overline{M}n$ is $\leq$ about 3.

19. Linear hydroquinone phenoxy polymer of claim 16 modified with up to about 20 mole percent of an aromatic diol.

20. Process of claim 19 wherein said aromatic diol is resorcinol.

21. Linear hydroquinone phenoxy polymer of claim 16 modified with up to about 10 mole percent of an aromatic diol.

22. Process of claim 21 wherein said aromatic diol is resorcinol.

23. Shaped object of the polymer of claim 16.
24. Shaped object of the polymer of claim 19.
25. Shaped object of the polymer of claim 20.
26. Shaped object of the polymer of claim 21.
27. Shaped object of the polymer of claim 22.

* * * * *